United States Patent [19]

Amstutz et al.

[11] Patent Number: 4,626,073
[45] Date of Patent: Dec. 2, 1986

[54] LIQUID CRYSTAL DISPLAY CELL WITH ELASTIC CELL SPACERS

[75] Inventors: Hermann Amstutz, Mellingen; Meinolph Kaufmann, Rütihof-Baden, both of Switzerland

[73] Assignee: BBC Brown, Boveri & Company, Limited, Baden, Switzerland

[21] Appl. No.: 628,288

[22] Filed: Jul. 6, 1984

[30] Foreign Application Priority Data

Jul. 8, 1983 [CH] Switzerland .............. 3764/83

[51] Int. Cl.$^4$ ............................................. G02F 1/13
[52] U.S. Cl. ..................................... 350/344; 350/336
[58] Field of Search ..................... 350/336, 343, 344

[56] References Cited

U.S. PATENT DOCUMENTS 4,362,771  12/1982  Umeda et al. ............. 350/344 X
4,516,836   5/1985  Ferrato ......................... 350/336

Primary Examiner—John K. Corbin
Assistant Examiner—Richard F. Gallivan
Attorney, Agent, or Firm—Oblon, Fisher, Spivak, McClelland, & Maier

[57] ABSTRACT

A liquid crystal display cell including a liquid crystal layer contained between two plane-parallel support plates provided with electrode layers on their mutually inward facing surfaces as well as a border. The support plates are held apart within a predetermined separation range by means of spacers. Those spacers distributed in the border are electrically conductive and serve as contact bridges between through-contact points on the support plates. Rubber-like elastic particles, e.g. from a silicone elastomer, are used as spacers to prevent low pressure bubbles in the liquid crystal layer at temperatures of −30° C. as well as to prevent loss of contact between the through-contact points. The rubber-like elastic particles, between the through-contact points are electrically conductive.

13 Claims, 3 Drawing Figures

LIQUID CRYSTAL DISPLAY CELL WITH ELASTIC CELL SPACERS

BACKGROUND OF THE INVENTION

1. Field of the Invention

This invention relates to a liquid crystal display cell having a liquid crystal layer switchable between two optically distinguishable states, wherein the liquid crystal layer is contained between two plane-parallel support plates separated within a predeterined range by spacers.

2. Description of the Prior Art

In a liquid crystal cell the separation between the two support plates, which essentially determines the thickness of the liquid crystal layer, should be as constant as possible over the entire area of the cell. One way to achieve a constant separation is through the introduction of spacers between the support plates.

Liquid crystal cells are known which have glass beads (DE-AS Nos. 28 15 405), glass fibers (GB No. 2 050 637A) or carbon fibers (CH No. 634 422) as spacers.

Spacers composed of electrically conductive material serve, aside from their function as spacers, to make contact bridges between the electrode layers of the two support plates. These spacers are generally distributed in the border, outside of the liquid crystal liquid.

When liquid crystal cells provided with the known spacers are exposed to extreme temperatures ($-30°$ C., $+80°$ C.) or to high relative humidity (90%) numerous defects occur. Low-pressure bubbles, known as vacuoles, appear in the liquid crystal layer at low temperatures. These vacuoles are caused by the differences in the thermal expansion coefficients of the liquid crystal layer and the other cell materials, such as the spacers. At high temperatures and high relative humidities defects appear which are dependent on corrosion. The border, which is also usually the seal, swells and the electrically conducting spacers distributed in the border thereby lose contact with the electrode layers. Contact interruptions are the result. If the liquid crystal cell is operated in transmission with a dark background, then glass spacers inside the liquid crystal layer become visible as luminous bright points and increase the overall brightness of the background. This leads to a poor contrast. Glass spacers in colored liquid crystal layers are especially disturbing because glass that is only a few $\mu m$ thick cannot be colored intensely enough. Reducing the number of glass spacers in the liquid crystal layer causes them to shatter under the pressure required for the manufacture of the liquid crystal cell.

SUMMARY OF THE INVENTION

Accordingly, the objects of this invention are to provide a novel liquid crystal cell of the above-mentioned type, which is fully functional even at extreme temperatures and high relative humidity and which has at high overall contrast.

These and other objects are achieved according to this invention by providing a novel liquid crystal cell having a liquid crystal layer, switchable between two optically distinguishable states, which is contained between two plane-parallel support plates held apart within a predetermined separation range by means of spaces and provided on their mutually inward facing surfaces with electrode layers as well as a border, wherein rubber-like elastic particles are employed as spacers.

The advantages achieved through this invention are essentially seen in that, because of the rubber-like elasticity of the spaces, the separation between the two support plates can be decreased enough at low temperatures so that no vacuoles occur. At high temperatures and high relative humidity the electrically conducting rubber-like elastic spacers in the border, as long as they are elastically deformed at the normal separation of the support plates, can remain in positive contact with the electrode layers by decreasing their deformation when the seal swells. By this means contact interruptions are avoided. The number of spacers in the liquid crystal layer can also be reduced since rubber-like elastic spacers do not break under the usual pressure applied during the manufacturing process. This guarantees an increased display contrast. Moreover it is no problem to dye rubber-like elastic material to match the colored surroundings of the liquid crystal layer. The spacers then no longer introduce a disturbing appearance in the liquid crystal layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
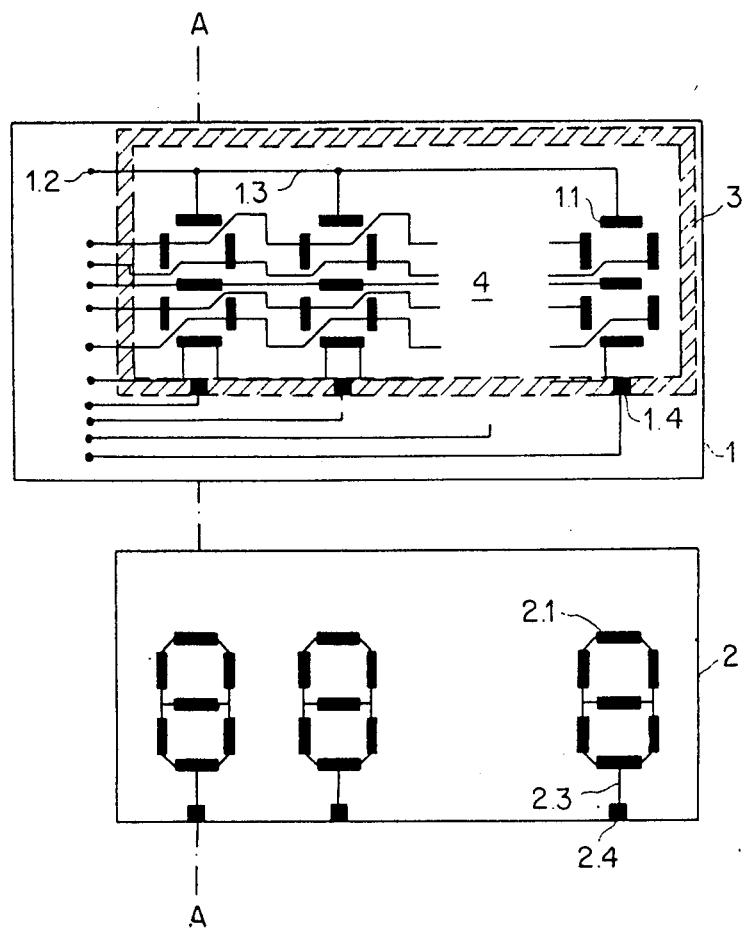
FIG. 1 is a top view of the support plates of a liquid crystal cell with a plurality of electrode layers.

In the drawings details that are not necessary for the direct understanding of the invention are not shown.

DESCRIPTION OF THE PREFERRED EMBODIMENTS

Referring now to the drawings, wherein like reference numerals designate identical or corresponding parts throughout the several views, FIG. 1 illustrates a top view of a front support plate 1 and a rear support plate 2 of a liquid crystal cell. Both support plates 1, 2, which are preferably of glass or a plastic like MYLAR, polycarbonate or Plexiglass, are provided with electrode layers. The electrode layers on both support plates are subdivided in the same way into plurality of segments arranged in groups for the display of a plurality of digits. Because of their large number, only a few of the segments on both support plates 1, 2 are provided with reference numbers, namely 1.1, 2.1, etc.. All segments are arranged inside a border 3, which is preferably the cell seal. The border 3 in FIG. 1 is arranged on the underside of the front support plate 1 and is therefore drawn with dashed lines. The border 3, together with the support plates 1, 2, form a cell, inside of which is enclosed a liquid crystal layer 4. To make the cell, the front support plate 1 must be laid on the rear support plate 2. Terminals 1.2 are deposited on the front support plate 1, outside of the border 3, from which conducting paths 1.3 lead to the the segments 1.1 as well as to the through-contact points 1.4. To the latter are provided corresponding through-contact points 2.4 on the rear support plate 2. Conducting paths 2.3 lead from these to the segments 2.1. Again, because there are so many terminals, conducting paths and through-contact points, only one reference number will be used for each of them. All through-contact points 1.4 and 2.4 lie in the region of the border 3 and, after the liquid crystal cell is assembled, are electrically connected to each other by means of contact bridges in the border 3.

Figure 2:
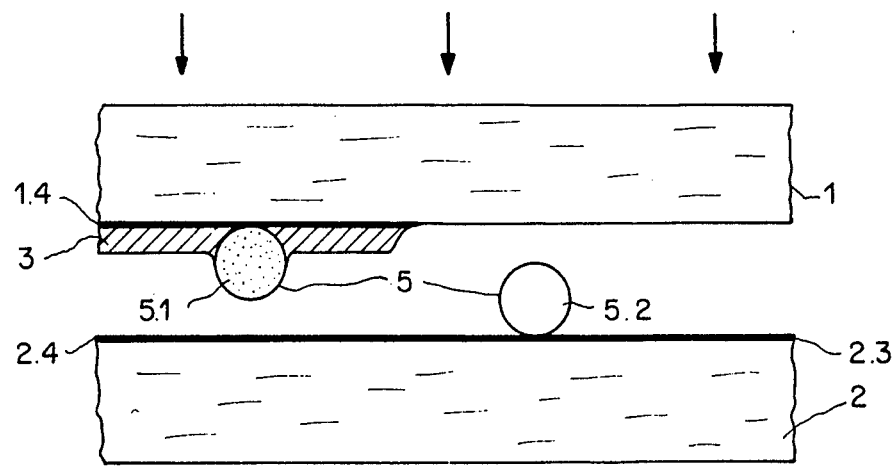
FIG. 2 is a cross-sectional view along the line A—A through the liquid crystal cell of FIG. 1 before its assembly with the rubber-like elastic spacers of this invention.
Figure 3:
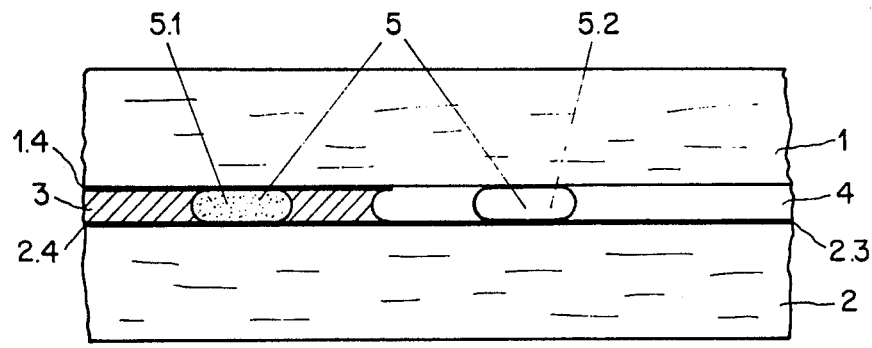
FIG. 3 is a cross-sectional view as in FIG. 2 along the line A—A through the liquid crystal cell of FIG. 1, but after its assembly.

FIG. 2 shows a section through the liquid crystal cell of FIG. 1 before its assembly taken along the line A—A in FIG. 1. Between the two support plates 1, 2, in the region of the border 3 as well as in the region of the liquid crystal layer 4, rubber-like elastic particles 5 are introducec as spacers. It is preferable that the rubber-like elastic particles 5 have a spherical shape. Their diameter is larger than the separation between the support plates 1, 2, which determines the thickness of the liquid crystal layer 4 after the cell is asesmbled. In this respect the rubber-like elastic particles 5 are elastically deformed in the assembled state of the liquid crystal cell as is illustrated in FIG. 3. It is preferable that the rubber-like elastic particles 5 are elastically deformable over a range of separations of the support plates 1, 2 amounting to ±50% of a given normal separation.

Even at temperatures of −30° C. and lower, the separation between the two support plates 1, 2 can always optimally adapt to the thickness of the liquid crystal layer 4. Low pressure bubbles in the liquid crystal cell are thus avoided.

The rubber-like elastic particles 5 in the border region 3 have an electrical conductivity. they are designated with the reference numeral designation 5.1 to differentiate them from the electrically non-conducting rubber-like elastic particles 5.2 in the region of the liquid crystal layer 4. Upon assembly of the liquid crystal cell, the two support plates 1, 2 are pressed together so strongly that the seal material 3, usually applied by a silk-screen process and generally a plastic, is completely pushed aside by the electrically conducting rubber-like elastic particles 5.1 so that these can enter into direct contact with the through-contact points 1.4 and 2.4. The electrically conducting rubber-like elastic particles 5.1 form the contact bridges mentioned earlier between the through-contact points 1.4 and 2.4 on the support plates 1 and 2.

A good and positive contact between the through-contact points 1.4 and 2.4 at the normal separation of the support plates 1, 2 is provided by means of the elastic deformation of the rubber-like elastic particles 5, including the the electrically conducting ones 5.1. This contact is not lost when, at high temperatures and high relative humidity, the border 3 swells and the separation between the support plates 1, 2 increases from the normal separation. The electrically conducting, rubber-like elastic particles 5.1 can advantageously elastically adapt themselves to such a change in separation through their properties as described in this invention.

The number of electrically conducting, rubber-like elastic particles 5.1 in the border region 3 is chosen to be large enough so that even with a random distribution, there is a high probability that at least one particle will lie between each of the corresponding through-contact points 1.4 and 2.4. On the other hand, the upper limit to the number of electrically conducting, rubber-like elastic particles 5.1 is determined by the requirement that the vast majority of the electrically conducting, rubber-like particles 5.1 are not allowed to mutually touch.

Thus in the border 3 the desired perpendicular conductivity and contact between mutually corresponding through-contct points 1.4 and 2.4 is provided, but lateral or crosswise conductivity is avoided.

In FIG. 1 there is no mutual contact between the different through-contacting points 1.4 and 2.4 belonging to different digits or the conducting paths 1.3 over the border 3.

The preferred material for the rubber-like elastic particles is a silicone elastomer. It is preferable to prepare particles of suitable size through emulsion polymerization and subsequent selection. A silicone elastomer filled with electrically conducting pigment can be used for the electrically conducting, rubber-like elastic particles 5.1. Soot, graphite, or metal powder, preferably silver powder, come under consideration as electrically conducting pigments. Their proportion in the silicone elastomer should be about 5–10%, preferably 8%. By this means contact resistances of only a few hundred $\Omega$-cm are achieved. The size of the electrically conducting pigment should lie in the region between 0.1 and 10 $\mu$m. The rubber-like elastic particles 5.2 distributed in the region of the liquid crystal layer 4 can be colored by means of pigments to match the colored surroundings of the liquid crystal. The rubber-like elastic particles 5 can also, for example, be deposited on one of the support plates 1 or 2 in the form of droplets by a silk-screening process before the liquid crystal cell is assembled. If a silicone elastomer is used for the rubber-like elastic particle 5, then the polymerization could take place after deposition on the support plates 1 or 2. The deposition of the rubber-like elastic particles 5 on one of the support plates 1 or 2 has the advantage that the rubber-like elastic particles 5 can be disposed at defined points inside the liquid crystal layer 4 or on the border 3. In the border 3 they would usually be disposed between the through-contact points 1.4 and 2.4, and inside the liquid crystal layer 4, preferably from each other.

Obviously, numerous modificatons and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A liquid display cell comprising:
   two lane-parallel support plates having mutually inward facing surfaces provided with respective electrode layers and a border surrounding said electrode layers;
   a liquid crystal layer switchable between two optically distinguishable states contained in a space between said plates and said border; and
   rubber-like elastic particles disposed between said plates and serving as spacers to maintain said plates separated within a predetermined separation range.

2. A liquid crystal cell as in claim 1, wherein the rubber-like elastic particles are elastically deformable as long as the support plates have a separation in a range of about ±50% of a predetermined nominal separation.

3. A liquid crystal cell as in claim 1, wherein the rubber-like elastic particles have a spherical shape.

4. A liquid cyrstal cell as in claim 2, wherein the rubber-like elastic particles have a spherical shape.

5. A liquid crystal display cell as in claim 4, comprising:

said rubber-like elastic particles being disposed between the support plates at definite points, in said border, and inside the liquid crystal layer but not between electrode layers which lie across from each other.

6. A liquid crystal display cell according to claim 4, comprising:
   said plates having opposed through-connection contact points; and
   electrically conductive of said elastic particles disposed between said contact points to electrically connect said contact points.

7. A liquid crystal display cell according to claim 6, comprising:
   said through-connection contact points being located in said border.

8. A liquid crystal cell as in claim 1, wherein said rubber-like elastic particles comprise:
   electrically conductive rubber-like elastic particles distributed in the border and serving as spacers.

9. A liquid crystal cell as in claim 8, wherein the vast majority of the electrically conductive rubber-like elastic particles in the border have no mutual contact.

10. A liquid crystal cell comprising:
    two plane-parallel support plates having mutually inward facing surfaces provided with respective electrode layers and a border surrounding said electrode layers;
    a liquid crystal layer switchable between two optically distinguishable states contained in a space between said plates and said border; and
    rubber-like elastic particles disposed between said plates and serving as spacers to maintain said plates separated within a predetermined separation range;
    wherein said rubber-like elastic particles comprise:
    a base material formed of a silicone elastomer.

11. A liquid crystal display cell as in claim 10, wherein the electrically conducting rubber-like elastic particles comprise:
    a silicone elastomer filled with an electrically conductive pigment.

12. A liquid crystal display cell as in claim 11, wherein said electrically conductive pigment is selected from the group consisting of soot, graphite and metal powder.

13. A liquid crystal display cell as in claim 10, wherein said silicone elastomer has a color matched to the color in the surrounding liquid crystal cell for the rubber-like elastic particles distributed inside the liquid crystal layer.

* * * * *